(12) United States Patent
Harris et al.

(10) Patent No.: US 11,377,032 B2
(45) Date of Patent: Jul. 5, 2022

(54) ACTUATOR, SUB-ASSEMBLY WITH ACTUATOR AND MIRROR HEAD, REAR VIEW DEVICE, DOOR AND VEHICLE

(71) Applicant: MOTHERSON INNOVATIONS COMPANY LIMITED, London (GB)

(72) Inventors: Tom Harris, Portchester (GB); Gareth Aspden, Portchester (GB); David Kershaw, Portchester (GB); Stephen Beecher, Portchester (GB); Levente Kurti, Portchester (GB); Warwick Jones, Portchester (GB); Dong Myeong Park, Portchester (GB)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/993,435

(22) Filed: Aug. 14, 2020

(65) Prior Publication Data
US 2021/0046875 A1    Feb. 18, 2021

(30) Foreign Application Priority Data
Aug. 16, 2019   (DE) .................. 10 2019 122 123.4

(51) Int. Cl.
*B60R 1/074*   (2006.01)
*B60R 1/072*   (2006.01)

(52) U.S. Cl.
CPC .............. *B60R 1/074* (2013.01); *B60R 1/072* (2013.01)

(58) Field of Classification Search
CPC ........... B60R 1/074; B60R 1/07; B60R 1/072; B60R 1/06; B60R 1/076; B60R 1/0617;
(Continued)

(56) References Cited

U.S. PATENT DOCUMENTS 4,428,649 A * 1/1984 Main ..................... B60R 1/07
                                                    200/1 V
6,340,231 B1   1/2002 Polzer
(Continued)

FOREIGN PATENT DOCUMENTS

| EP | 0838371 A1 | 10/1997 |
| FR | 2454935 A1 | 4/1979 |
| WO | WO 2016/076713 A1 | 5/2016 |

OTHER PUBLICATIONS

German Office Action dated Feb. 21, 2020 of German application No. DE 102019122123.4.
(Continued)

*Primary Examiner* — Jade R Chwasz
(74) *Attorney, Agent, or Firm* — Jones Day

(57) ABSTRACT

An actuator for a rear view device of a vehicle includes a body defining a folding axis for the rear view device, a tilt axle having a fastening means for torque-proof fastening the rear view device to the tilt axle and defining a tilting axis for the rear view device, an actuator housing being rotatable borne by the body and being configured for rotatable bearing the tilt axle, and a drive assembly being arranged completely within the actuator housing and being configured for rotating the actuator housing about the folding axis relative to the body by a folding angle and for rotating the tilt axle about the tilting axis relative to the actuator housing by a tilting angle.

32 Claims, 6 Drawing Sheets

(58) Field of Classification Search
CPC ........... B60R 1/0612; B60R 2011/0092; F16D 7/024; F16H 25/16
USPC ........................................................ 359/841
See application file for complete search history.

(56) References Cited

U.S. PATENT DOCUMENTS

| | | | |
|---|---|---|---|
| 9,199,577 B1* | 12/2015 | Messina | B60R 1/062 |
| 2007/0084707 A1* | 4/2007 | van den Brink | B60R 1/074 200/329 |
| 2013/0107386 A1 | 5/2013 | Sobecki et al. | |
| 2017/0240114 A1* | 8/2017 | Brouwer | B60R 1/072 |

OTHER PUBLICATIONS

Great Britain Search Report dated Jan. 26, 2021 of application No. GB 2012706.4.

* cited by examiner

ACTUATOR, SUB-ASSEMBLY WITH ACTUATOR AND MIRROR HEAD, REAR VIEW DEVICE, DOOR AND VEHICLE

CROSS-REFERENCE TO RELATED APPLICATION

This application claims the benefit of priority to German Patent Application No. DE 10 2019 122 123.4, filed Aug. 16, 2019, which is hereby incorporated by reference in its entirety for all purposes.

BACKGROUND

1. Field of the Invention

The present disclosure relates to an actuator for a rear view device of a vehicle. The invention further relates to a sub-assembly with actuator and mirror head, a rear view device for a door of a vehicle, a door for a vehicle and a vehicle.

2. Related Art

In the art, a large variety of actuators for rear view devices of vehicles are known. An actuator for a rear view device enables the rear view device to be folded or tilted automatically. Usually a separate actuator is used for folding and tilting the rear view device, respectively.

In the context of the invention folding means rotating the rear view device about a substantially vertical axis. In a first application, a folding operation essentially either aligns the rear view device with an outer surface of the door for laterally narrowing the vehicle during a parking time of the vehicle or folds out the rear view device to protrude from the surface of the door for allowing a view rearward of the equipped vehicle.

In a second application which relates to the out-folded state of the rear view device, the folding operation horizontally adjusts the rear view device to a driver of the vehicle in order to provide a desired horizontal perspective.

Tilting, in the context of the invention, means rotating the rear view device about a substantially horizontal axis. A tilting operation vertically adjusts the rear view device to the driver of the vehicle in order to provide a desired vertical perspective.

A frameless rear view device comprises a reflective element that is mounted to a mirror housing similar to conventional rear view devices. However, in a frameless rear view device, the reflective element remains static once attached to the mirror housing, meaning that it cannot be actuated relative to the housing in the way a reflective element of a conventional rear view device may be. In conventional rear view devices, the reflective element is usually pivoted, i.e. folded and/or tilted, relative to the mirror housing with a second actuator.

As the frameless rear view device does not provide a relative degree of freedom of the reflective element with respect to the mirror housing, the frameless rear view device cannot be actuated conventionally.

In addition, WO 2016/076 713 A1 describes a device for adjusting a shell-shaped housing part, for example a mirror housing. The device, in particular a door mirror device, consists of a base part on which a supporting frame is provided by means of a first hinge construction. In addition, the device comprises a first actuator with which the supporting frame can be pivoted relative to the base part to a part of a substantially upwardly extending first pivot axis between a folded position, in which the supporting frame lies, for example, substantially along the body of a motor vehicle, and an unfolded position, in which the supporting frame is oriented, for example, substantially transverse to the body. By means of a second hinge construction, a support, in particular for supporting a mirror surface, is arranged on the supporting frame. Furthermore, the device comprises a second actuator by means of which the support is pivotable with respect to the supporting frame, wherein the support and a reflecting surface, which may be carried thereon, is/are pivotable with respect to the supporting frame only to a second hinge axis substantially transverse to the substantially upwardly directed second hinge axis.

U.S. Pat. No. 6,340,231 B1 teaches an electrically adjustable exterior rear-view mirror for a motor vehicle with a mirror element, a housing and a mirror base which can be attached to the motor vehicle. The mirror element and the housing are rigidly connected to each other and between the housing and the mirror base there is an adjusting gear which can be driven by at least one electric motor.

From EP 0 838 371 A1 an exterior mirror for a vehicle, in which a mirror housing, in which a mirror which is electrically adjustable about at least a first axis within a predetermined angular range is arranged, is hinged to a foot, which can be attached to the vehicle, so as to be foldable about a second axis and can be folded down by activating an electric motor, is known. In order to simplify the adjustment mechanism, it is provided that a first output member of the motor is coupled to the foot via a predetermined drive escapement which can be overcome, and that a second output member of the motor, electromagnetically coupled to the first output member, is coupled to the mirror via a joint and is rotatably mounted in the mirror housing in such a way that the bearing friction of the second output member is smaller than the drive escapement.

FR 2 454 935 A1 also teaches remote-controlled positioning of two axes of a vehicle rearview mirror. The positioning mechanism is electrically driven and is particularly suitable for large mirrors used on heavy trucks etc. The mirror position is adjusted from the driver's dashboard. The mirror is driven by two motors with reduction gears housed in a common casing mounted on a column fixed to the vehicle, the column carrying the motor wiring. The shell is mounted at the mirror position and connected to it by a double pivoting arm, with a pivot point providing a mechanical connection to the motor gearbox for controlling the vertical axis. Movement in the horizontal plane is achieved by means of gearing with a shaft which is held in the housing wall at both end positions and which in turn is driven around the support column by a further gearing.

Therefore, it would be desirable to produce an actuator that can provide both a folding operation as well as a tilting operation of a mirror head.

SUMMARY

In an aspect, an actuator for a rear view device of a vehicle provides at least a folding function and a tilting function, is very compact and may be easily mounted within a small rear view device. Also described are a rear view device for a door of a vehicle, a door for a vehicle and a vehicle with such an actuator.

In an aspect, an actuator for a rear view device of a vehicle includes a body defining a folding axis for the rear view device, a tilt axle having a fastening means for torque-proof fastening the rear view device to the tilt axle and defining a tilting axis for the rear view device, an actuator housing being rotatably borne by the body and being configured for rotatably bearing the tilt axle, and a drive assembly being arranged completely within the actuator housing and being configured for rotating the actuator housing about the folding axis relative to the body by a folding angle and for rotating the tilt axle about the tilting axis relative to the actuator housing by a tilting angle. The drive assembly has a tilt drive train for rotating the tilt axle and a fold drive train for rotating the actuator housing, wherein the tilt drive train and the fold drive train are configured to work completely independently from each other by sharing a common shaft.

In other words, the actuator is configured as a combined actuator, wherein the drive assembly provides the actuator both with a folding function and a tilting function.

An advantage of a combined actuator is that it meets the design criteria for a frameless mirror, in that it may enable adjustment of the mirror head along two axes using a single actuator. Further, the tilting axis and folding axis of the actuator can be substantially perpendicular, with further details being described below.

A further advantage of the actuator is that the actuator requires less space than two separate actuators for folding and tilting, respectively.

A further advantage of this actuator is that the actuator can be produced very compact by using the common shaft for the folding drive train and the tilting drive train.

In particular, the tilt drive train comprises a tilt electric motor and, for rotatable coupling the tilt axle to the tilt electric motor, gear means, wherein the gear means preferably comprise a first tilt worm gear being torque-proof fastened to a drive shaft of the tilt electric motor, a tilt clutch gear being frictionally engaged with the tilt axle, a first tilt spur gear being engaged with the tilt clutch gear, a second tilt worm gear being engaged with the first tilt spur gear, and a second tilt spur gear being engaged with the first tilt worm gear and torque-proof fastened to the second tilt worm gear. These components of the tilt drive train provide for an automatic tilting operation of the actuator and transform a rotational speed of the tilt drive shaft of the tilt electric motor into the tilting angular speed of the tilt axle relative to the actuator housing.

The tilt drive train preferably comprises a tilt spring, a tilt clutch insert and a tilt retainer axially fastened to the tilt axle, wherein the tilt clutch gear and the tilt clutch insert have matching bevel sections for engaging frictionally, wherein the tilt spring is preferably supported by the tilt retainer and configured for pressing the bevel section of the tilt clutch insert against the corresponding bevel section of the tilt clutch gear.

The matching bevel sections of the tilt clutch insert and tilt clutch gear form what is commonly known as a cone clutch. During normal operation of the actuator, the tilt clutch gear and tilt clutch insert are forced together by the pressure applied by the tilt spring. This pressure allows the tilt clutch gear and tilt clutch insert to rotate together in order to allow the actuator to provide a tilting function. However, when an external force is applied that is large enough to overcome the frictional engagement between the tilt clutch gear and tilt clutch insert, they are able to slide past each other which allows for manual adjustment of the rearview mirror assembly head around the tilt axle.

In an alternative embodiment the tilt drive train comprises a tilt spring, and a plurality of tilt clutch plates mounted to the tilt axle, with a first number of the tilt clutch plates engaging with the tilt axle, and a remaining second number of the tilt clutch plates engaging with the tilt clutch gear and remaining fixed when an external moment is applied manually to the tilt axle. These components of the tilt drive train allow for separating the tilt axle from the tilt drive train by manually applying an external moment to the tilt axle relative to the tilting axis.

In an advantageous embodiment of this actuator a position feedback mechanism may be incorporated in order to provide a memory function. In this advantageous embodiment the tilt drive train comprises a position sensing potentiometer providing a position feedback of the tilt angle, and/or the tilt drive train comprises a tilt wiper bevel gear, a tilt wiper being attached to the tilt wiper bevel gear and electrically contacting a tilt carbon strip, and a tilt bevel gear, wherein preferably the tilt wiper bevel gear engages the tilt bevel gear being torque-proof fastened to the tilt axle. The tilt wiper and the tilt carbon strip form a potentiometer. The potentiometer maps an angular position of the tilt axle onto an electric resistance. The electric resistance may be used as a measure of the angular position and stored for providing the actuator with a memory function related to a tilting angle. The potentiometer provided by the tilt wiper and the tilt carbon strip can also be used for position feedback of the tilt angle for functions such as position sensing. Thus, the actuator allows for a tilt position feedback in either configuration.

The drive assembly preferably comprises a fold drive train for rotating the actuator housing and being configured for providing a first folding angular speed of the actuator housing. The folding angular speed may be in a range from 10°/s to 50°/s, particularly from 25°/s to 35°/s and preferably of 30°/s and a second folding angular speed can be in a range from 1°/s to 50°/s, particularly from 3°/s to 5°/s and preferably of 4°/s. The first range of folding angular speeds allows for a quick aligning or out-folding of the rear view device, while the second range of folding angular speeds allows for a comfortable and precise adjustment of the rear view device. The drive assembly, hence, may be configured for either a single speed folding or a multiple speed folding.

In particular, the fold drive train may comprise a fold electric motor, and for rotatable coupling the body to the fold electric motor, gear means, wherein preferably the gear means comprise a first fold worm gear being torque-proof fastened to a drive shaft of the fold electric motor, a fold clutch gear being frictionally engaged with the body, a second fold worm gear being engaged with the fold clutch gear, and a fold spur gear being engaged with the first fold worm gear and torque-proof fastened to the second fold worm gear. These components of the fold drive train provide for an automatic folding operation of the actuator and transform a rotational speed of the fold drive shaft of the fold electric motor into the respective folding angular speeds of the actuator housing relative to the body.

The fold drive train preferably comprises a fold spring and a fold retainer axially fastened to the body, wherein the body and the fold clutch gear both have corresponding bevel sections for engaging frictionally, and wherein the fold spring preferably is supported by the fold retainer and configured for pressing the bevel section of the fold clutch gear against the corresponding bevel section of the body. These components of the fold drive train allow for separating the actuator housing from the fold drive train by manually applying an external moment to the actuator housing relative to the folding axis.

The matching bevel sections of the body and fold clutch gear form what is commonly known as a cone clutch. During normal operation of the actuator, the body and fold clutch gear are forced together by the pressure applied by the fold spring. This pressure allows creates friction between the beveled sections of the body and fold clutch gear in order to hold the fold clutch gear in place. However, when an external force is applied that is large enough to overcome the frictional engagement between the body and fold clutch gear, they are able to slide past each other which allows for manual adjustment of the rearview mirror assembly head.

In an alternative embodiment the fold drive train comprises a fold spring and a plurality of fold clutch plates mounted to the fold clutch gear, with a first number of the fold clutch plates engaging with the fold clutch gear for rotating with the fold clutch gear, and a remaining second number of the fold clutch plates engaging with the body remaining fixed when an external moment is applied manually to the fold clutch gear, through the actuator housing.

In an advantageous embodiment the fold drive train comprises a position sensing potentiometer providing a position feedback of the folding angle, and/or the fold drive train comprises a fold wiper being attached to the fold retainer, with the fold wiper electrically contacting a fold carbon strip, wherein the fold retainer preferably is torque-proof fastened to the body. The fold wiper and the fold carbon strip form a potentiometer. The potentiometer maps an angular position of the actuator housing onto an electric resistance. The electric resistance may be used as a measure of the angular position and stored for providing the actuator with a memory function related to a folding angle. The potentiometer provided by the fold wiper and the fold carbon strip can also be used for position feedback of the folding angle for functions such as position sensing. Thus, the actuator allows for a fold position feedback in either configuration.

In still another embodiment the tilt electric motor and the fold electric motor are arranged at opposite sides of the body, and/or the tilt drive shaft, the fold drive shaft and/or the tilting axis extend parallel.

In an embodiment the body extends through the actuator housing and/or the tilting axis extends perpendicular relative to the folding axis when the actuator is mounted as intended. The actuator housing has opposite through-holes to be penetrated by the body. This allows for a very compact structure of the actuator.

In another embodiment the actuator housing is two-part, with the actuator housing particularly having a lower actuator housing and an upper actuator housing.

The upper actuator housing preferably has an upper bearing section matching a corresponding bearing section of the body and/or the lower actuator housing preferably has a lower bearing section matching a corresponding bearing section of the body. The radial bearings formed by the corresponding bearing sections enable the actuator housing for rotating about the body, thus, supporting the folding function of the actuator.

In an advantageous embodiment the body is shaped as a hollow core having a central bore extending parallel to the folding axis for accommodating a wiring harness, with the central bore particularly having a diameter of at least 17 mm. Thus, wires and plugs may easily be inserted into and extend through the body, i.e. the central bore of the body. In particular, the wires can freely twist during a folding operation whereby a damage of the wires due to the folding operation is avoided or at least considerably reduced.

The drive assembly may be configured for allowing a folding angle to have an absolute value less or equal to 70° relative to a neutral folding angle, i.e. for allowing a maximum total folding angle range of 140°, and/or for allowing a tilting angle to have an absolute value less or equal to 15° relative to a neutral tilting angle. The folding angle range and the tilting angle range allow for folding and adjusting the rear view device sufficiently in most practical cases.

The drive assembly preferably has a tilt drive train for automatically rotating the tilt axle and being configured for providing a tilting angular speed of the tilt axle about the tilting axis in a range from 1°/s to 25°/s, particularly from 3°/s to 5°/s, preferably of 4°/s. This range of tilting angular speeds allows for a comfortable and precise adjustment of the rear view device. The tilting may be carried out manually in response to a user input or automatically.

The drive assembly preferably has a common shaft being part of the tilt drive train and the fold drive train and bearing rotatably and independently from each other the second tilt worm gear and the second fold worm gear. The common shaft is the only component of the actuator which is shared between the tilt drive train and the fold drive train.

The drive assembly may have a printed circuit board in particular being torque-proof fastened to the actuator housing and having a recess to accommodate the body, wherein preferably the printed circuit board is configured for controlling the fold electric motor. The printed circuit board (PCB) is further configured to partially enclose the body and freely rotate about the folding axis.

In a preferred embodiment the printed circuit board is configured for controlling the fold electric motor by means of a pulse width modulation, the pulse width modulation allowing at least two different rotational speeds for the fold electric motor. Pulse width modulation (PWM) very easily allows for different rotational speeds of the fold drive shaft of the fold electric motor. As an alternative, the printed circuit board may be configured for allowing a single rotational speed of the fold electric motor, thus, not using PWM.

The printed circuit board may have a circular fold carbon strip to be electrically contacted by a fold wiper and circular tilt carbon strip to be electrically contacted by a tilt wiper, and/or the printed circuit board has a plurality of electrically conducting pins and the actuator housing has a corresponding through-hole for allowing an external access to the pins, the pins and the through-hole forming a plug socket of the actuator for receiving a plug of a wiring harness. The fold carbon strip and the tilt carbon strip may be easily arranged and attached to the printed circuit board in order to not increase the number of components required for the actuator. Due to the pins each electric component of the actuator is attached to and supported by the printed circuit board allowing for mounting the actuator very easily.

Another object of the invention is a sub-assembly comprising a mirror head of a rear view device and the actuator according to this invention.

Advantageously, the actuator can be either directly attached to a lower mirror housing or via a mirror holder, and an upper mirror housing can be either directly attached to the lower mirror housing or via the mirror holder.

Advantageously, a mirror housing, in particular the lower mirror housing, can have a through-hole, and the body of the actuator can extend through the through-hole.

Advantageously, the tilt axle is attached to the mirror holder via fastening means, in particular by inserting the tilt axle into a U-shaped opening for obtaining a form fit and/or frictional connection.

The sub-assembly may also comprise any other actuator for rotating the mirror head, wherein the actuator is connected to the mirror holder by fastening means, in particular by inserting a tilt axle of the actuator into a U-shaped opening for obtaining a form fit and/or frictional connection, so that the mirror holder, the lower mirror housing and the upper mirror housing are rotated together with the actuator.

Another object of the invention is a rear view device for a vehicle, having a base frame for attachment to the vehicle and the sub-assembly according to the present invention, wherein the body of the actuator is attached to the base frame.

Advantageously, the rear view device can comprise a sealing member, which is sealing a gap between the body and the lower mirror housing.

Advantageously, the rear view device can comprise a cone-shaped member arranged between the base frame and the actuator.

A mirror can be fixed to the lower mirror housing or to the mirror holder depending on the embodiment.

Another object of the invention is a door for a vehicle, comprising at least one wiring harness with a plug and a rear view device according to the invention, wherein the base frame of the rear view device is torque-proof fastened to the door, the at least one wiring harness extends through the body and the at least one plug of the at least one wiring harness is plugged into at least one plug socket of the actuator.

Still another object of the invention is a vehicle, having a rear view device according to the invention or a door according to the invention.

The above listed embodiments can be used individually or in any combination to provide the device and the process in accordance with the invention.

BRIEF DESCRIPTION OF THE DRAWINGS

These and other aspects of the invention are shown in detail in the illustrations as follows.

DETAILED DESCRIPTION

Figure 1:
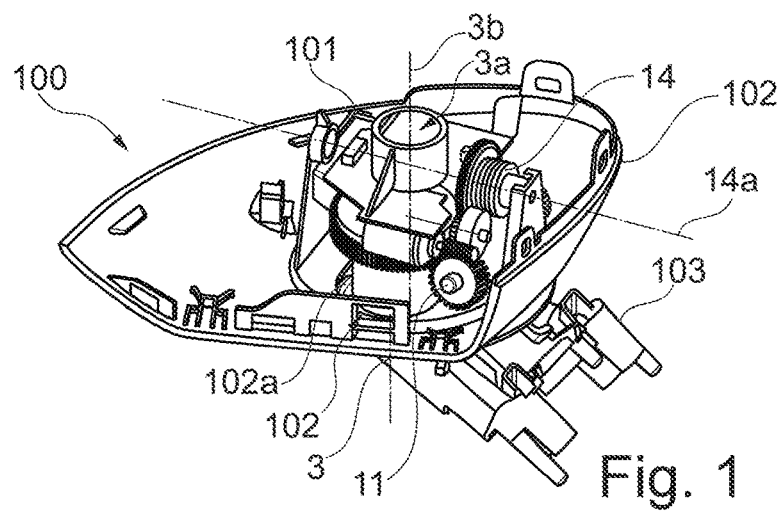
FIG. 1 is a schematic illustration of a perspective partial view of a door according to an embodiment of the invention.

FIG. 1 partially shows a rear view device 100 for a door (not shown) of a vehicle (not shown) with a base frame 103.

The rear view device 100 has an actuator 101 according to an embodiment of the invention, a lower mirror housing 102 having a through-hole 102*a* and an upper mirror housing (not shown) being fastened to the lower mirror housing 102.

The actuator 101 has a body 3 defining a folding axis 3*b* of the rear view device 100. The body 3 extends through the through-hole 102*a* of the lower mirror housing 102 when the actuator 101 is mounted as intended and is torque-proof fastened to the base frame 103 of the door by means of a mechanical interface. The rear view device 100 may further have a sealing member (not shown) for sealing a gap between the body 3 and the lower mirror housing 102. The body 3 is shaped as a hollow core having a plurality of concentric cylindrical sections and a central bore 3*a* extending parallel to the folding axis 3*b* for accommodating the wiring harness of the door. The central bore 3*a* may have a diameter of at least 17 mm for allowing the wiring harness and the plug of the wiring harness for easily being inserted into and extending through the central bore 3*a*.

Moreover, the actuator 101 has a tilt axle 14 defining a tilting axis 14*a* for the rear view device 100, the tilting axis 14*a* extending transverse relative to the folding axis 3*b*. The tilting axis 14*a* may particularly extend perpendicular relative to the folding axis 3*b*. The tilt axle 14 and the lower mirror housing 102 have corresponding fastening means for torque-proof fastening the lower mirror housing 102 to the tilt axle 14. In alternative embodiment the tilt axle 14 can be fastened to a case frame of the rear view device.

The fastening means may be formed as a screwed notch of the mirror housing 102 and a spring fit cap of the tilt axle 14 or vice versa. Of course, in alternative embodiments the upper mirror housing or both the lower mirror housing 102 and the upper mirror housing may be fastened to the tilt axle 14. It is pointed out, that a mirror (not shown) extends at least substantially parallel relative to the tilting axis 14*a*, when the upper mirror housing is fastened to the lower mirror housing 102 and the lower mirror housing 102 is fastened to the tilt axle 14.

The drive assembly has a common shaft 11 being part of the tilt drive train and the fold drive train.

Figure 2:
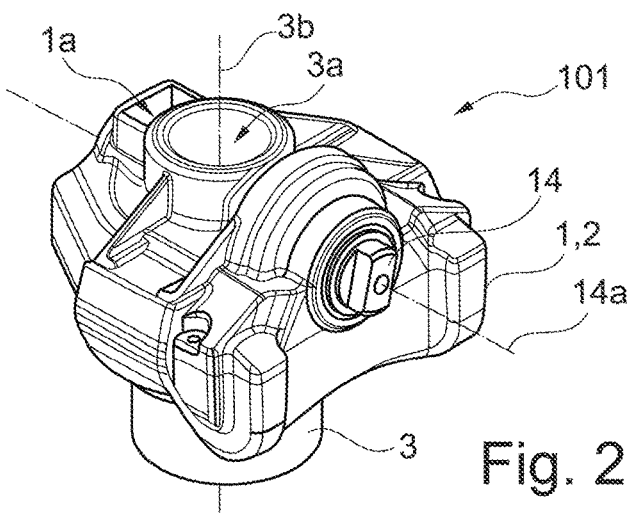
FIG. 2 is a schematic illustration of a perspective view of an actuator according to an embodiment of the invention.

FIG. 2 separately shows the actuator 101 shown in FIG. 1. The actuator 101 has an actuator housing 1, 2 in the intended mounted state. The actuator housing 1, 2 is rotatably borne by the body 3 and is configured for rotatably bearing the tilt axle 14 which protrudes from the actuator housing 1, 2. The actuator housing 1, 2 has a symmetric shape with respect to a plane defined by the folding axis 3*b* and the tilting axis 14*a*.

Figure 8:
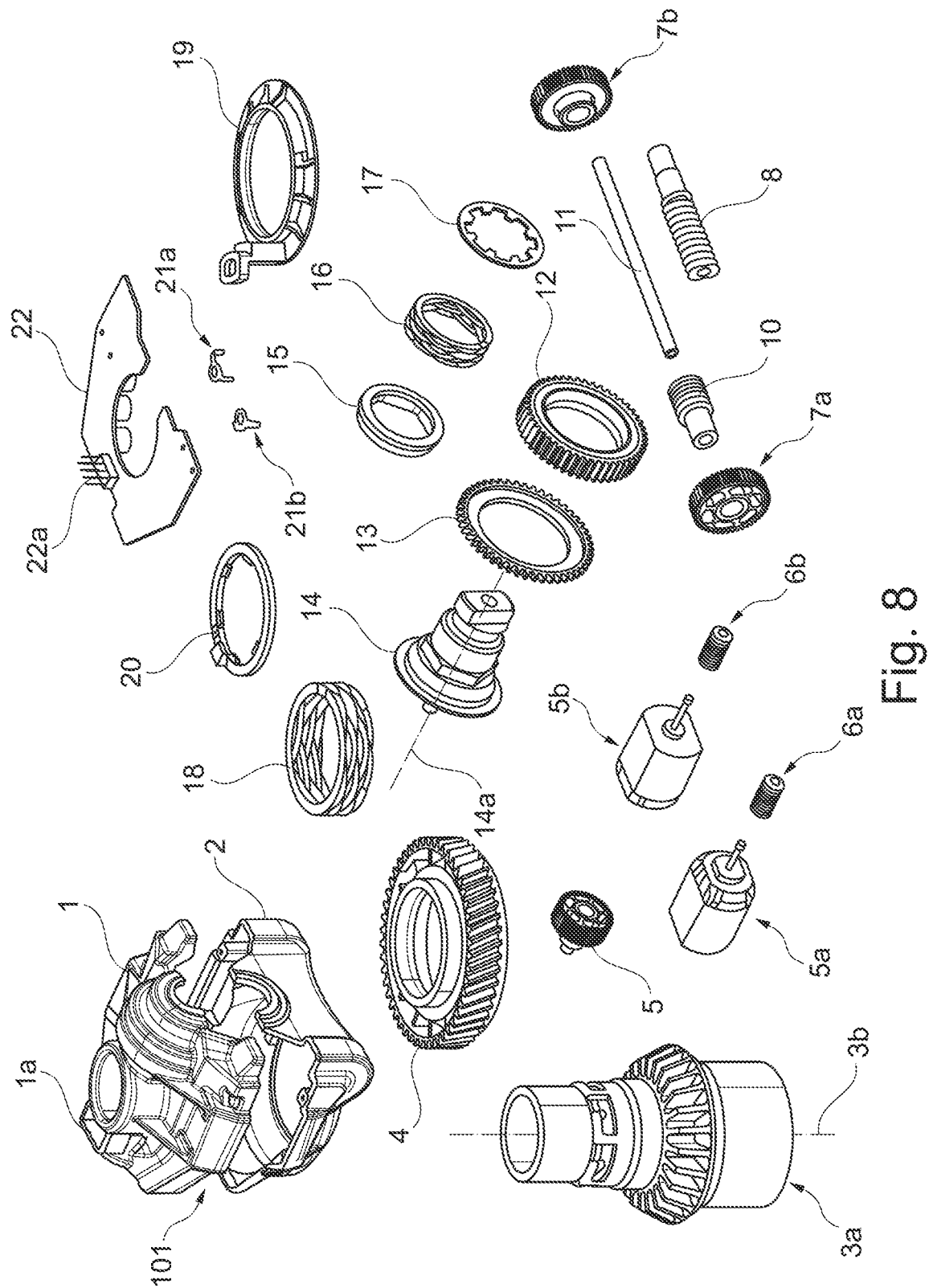
FIG. 8 is a schematic illustration of an exploded view of the actuator shown in FIG. 2.

The actuator housing 1, 2 may be two-part and preferably has a lower actuator housing 2 and an upper actuator housing 1 which are shown separately in FIG. 8. The upper actuator housing 1 has an upper bearing section matching a corresponding bearing section of the body 3 and the lower actuator housing 2 has a lower bearing section matching a corresponding bearing section of the body 3.

The upper actuator housing 1 further has a through-hole 1*a* for allowing an external access to pins 22*a* (hidden here, but shown in FIGS. 3, 5, 6, 7, 8). Thus, the pins 22*a* and the through-hole 1*a* form a plug socket of the actuator 101 for receiving the plug of the wiring harness. When the rear view device 100 is mounted as intended the plug of the wiring harness is plugged into the plug socket of the actuator 101.

Figure 3:
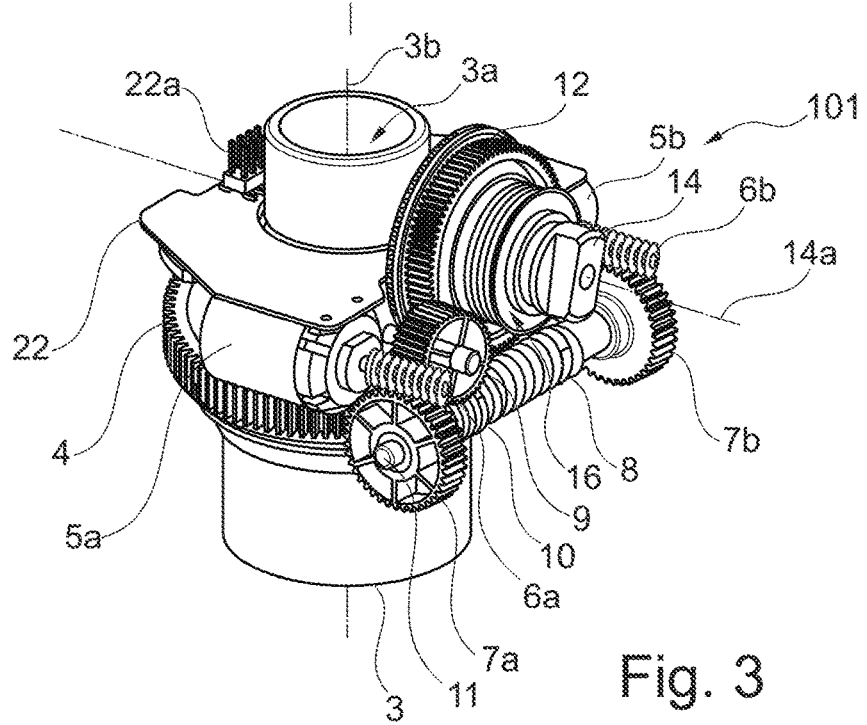
FIG. 3 is a schematic illustration of a perspective partial view of the actuator shown in FIG. 2.

FIG. 3 shows the actuator 101 with the housing 1, 2 being removed in order to reveal the inner structure of the actuator 101. The actuator 101 has a drive assembly being arranged completely within the actuator housing 1, 2, thus rendering the actuator 101 a highly integrated and very compact component.

The drive assembly is configured for rotating the actuator housing 1, 2 about the folding axis 3b relative to the body 3 by a folding angle and for rotating the tilt axle 14 about the tilting axis 14a relative to the actuator housing 1, 2 by a tilting angle. The drive assembly is preferably configured for allowing a folding angle to have an absolute value less or equal to 70° relative to a neutral folding angle, i.e. for allowing a maximum total folding angle range of 140°, and/or for allowing a tilting angle to have an absolute value less or equal to 15° relative to a neutral tilting angle. Of course, the absolute values of the folding angle and the tilting angle may even be chosen greater than 70° and 15°, respectively, if required.

The drive assembly has a tilt drive train for automatically rotating the tilt axle 14 and being configured for providing a tilting angular speed of the tilt axle 14 about the tilting axis 14a, for example, in a range from 3°/s to 5°/s.

The tilt drive train has a tilt electric motor 5a. For rotatably coupling the tilt axle 14 to the tilt electric motor 5a, the tilt drive trains has a first tilt worm gear 6a being torque-proof fastened to a drive shaft of the tilt electric motor 5a, a tilt clutch gear 12 being frictionally engaged with the tilt axle 14, a first tilt spur gear 9 being engaged with the tilt clutch gear 12, a second tilt worm gear 10 being engaged with the first tilt spur gear 9, and a second tilt spur gear 7a being engaged with the first tilt worm gear 6a and torque-proof fastened to the second tilt worm gear 10.

Furthermore, the drive assembly has a fold drive train for automatically rotating the actuator housing 1, 2 and being configured for providing a folding angular speed of the actuator housing 1, 2, preferably a first folding angular speed, for example, in a range from 25°/s to 35°/s and a second folding angular speed, for example, in a range from 3°/s to 5°/s.

The fold drive train has a fold electric motor 5b. For rotatably coupling the body 3 to the fold electric motor 5b, the fold drive train has a first fold worm gear 6b being torque-proof fastened to a drive shaft of the fold electric motor 5b, a fold clutch gear 4 being frictionally engaged with the body 3, a second fold worm gear 8 being engaged with the fold clutch gear 4, and a fold spur gear 7b being engaged with the first fold worm gear 6b and torque-proof fastened to the second fold worm gear 8.

The tilt electric motor 5a and the fold electric motor 5b are arranged at opposite sides of the body 3. The tilt drive shaft of the tilt electric motor 5a, the fold drive shaft of the fold electric motor 5b and the tilting axis 14a extend parallel. The tilt drive train and the fold drive train are configured to work completely independently from each other although they share a common shaft 11 rotatably bearing the second tilt worm gear 10 and the second fold worm gear 8.

The drive assembly additionally has a printed circuit board (PCB) 22. The printed circuit board 22 may be torque-proof fastened to the actuator housing 1, 2 and can have a recess to accommodate the body 3. The printed circuit board 22 is configured to control the tilt electric motor 5a and the fold electric motor 5b, particularly with an addition for controlling the fold electric motor 5b by means of a pulse width modulation. The pulse width modulation allows at least two different rotational speeds for the fold electric motor 5b in order to provide the first folding angular speed and the second folding angular speed mentioned above, respectively. A single speed actuator without a pulse width modulation is another alternative covered by the invention.

Further, the printed circuit board 22 has a plurality of electrically conducting pins 22a protruding perpendicular from the printed circuit board 22. The printed circuit board 22 also has a circular fold carbon strip (hidden by the PCB) to be electrically contacted by a fold wiper 21b (see FIGS. 7, 8) and a circular tilt carbon strip (hidden by the PCB) to be electrically contacted by a tilt wiper 21a (see FIGS. 7,8). The carbon strips and the wipers (21a, 21b) provide a memory function for the drive assembly.

The drive assembly has a common shaft 11 being part of the tilt drive train and the fold drive train and bearing rotatably and independently from each other the second tilt worm gear 10 and the second fold worm gear 8.

Figure 4:
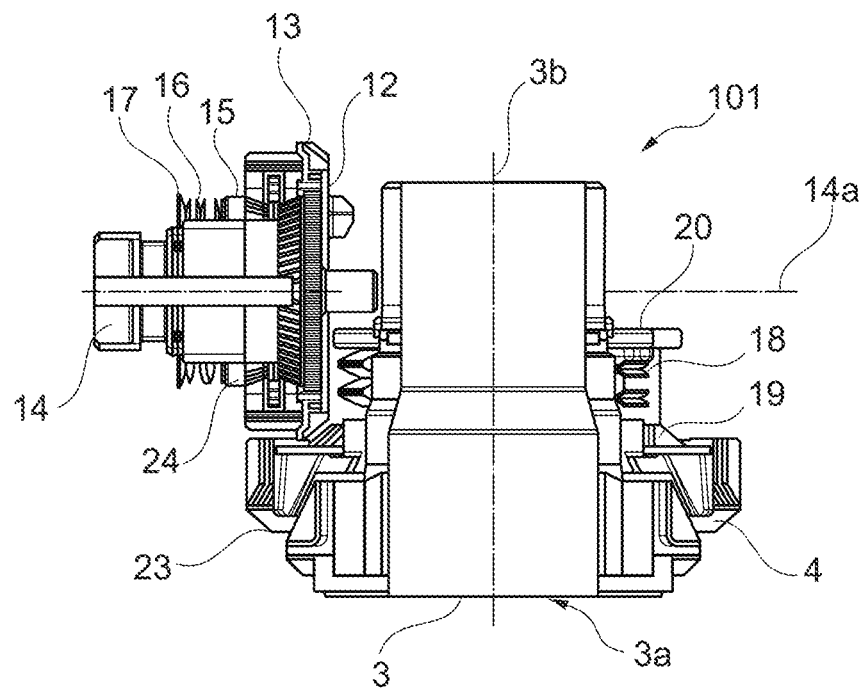
FIG. 4 is a schematic illustration of a lateral partial sectional view of the actuator shown in FIG. 2.

FIG. 4 shows a sectional view of the actuator 101 with the drive assembly partially removed in order to reveal further components of the drive assembly.

The tilt drive train can have a tilt spring 16 exemplarily formed as a wave spring, a tilt clutch insert 15 and a tilt retainer 17 axially fastened to the tilt axle 14. The tilt clutch gear 12 and the tilt clutch insert 15 both have matching bevel sections for engaging frictionally thus forming a tilt clutch interface 24. The tilt spring 16 is supported by the tilt retainer 17 and configured for pressing the bevel section of the tilt clutch insert 15 against the corresponding bevel section of the tilt clutch gear 12. The tilt spring 16, the tilt clutch insert 15 and the tilt retainer 17 are configured to allow for tilting manually the rear view device 100 by applying thereto a tilting moment exceeding the frictional force of the tilt clutch interface 24.

An alternative tilt drive train comprises a tilt wave spring, and a plurality of tilt clutch plates mounted to the tilt axle 14, with a first number of the tilt clutch plates engaging with the tilt axle 14, and a remaining second number of the tilt clutch plates engaging with the tilt clutch gear 12 and remaining fixed when an external moment is applied manually to the tilt axle 14.

The fold drive train may have a fold spring 18 exemplarily formed as a wave spring and a fold retainer 20 axially fastened to the body 3. The body 3 and the fold clutch gear 4 both have corresponding bevel sections for engaging frictionally thus forming a fold clutch interface 23. The fold spring 18 is supported by the fold retainer 20 and configured for pressing the bevel section of the fold clutch gear 4 against the corresponding bevel section of the body 3. The fold spring 18 and the fold retainer 20 are configured to allow for folding manually the rear view device 100 by applying thereto a folding moment exceeding the frictional force of the fold clutch interface 23.

An alternative fold drive train comprises a fold spring and a plurality of fold clutch plates mounted to the fold clutch gear 4, with a first number of the fold clutch plates engaging with the fold clutch gear 4 for rotating with the fold clutch gear 4, and a remaining second number of the fold clutch plates engaging with the body 3 remaining fixed when an external moment is applied manually to the fold clutch gear 4, through the actuator housing 1, 2.

Figure 5:
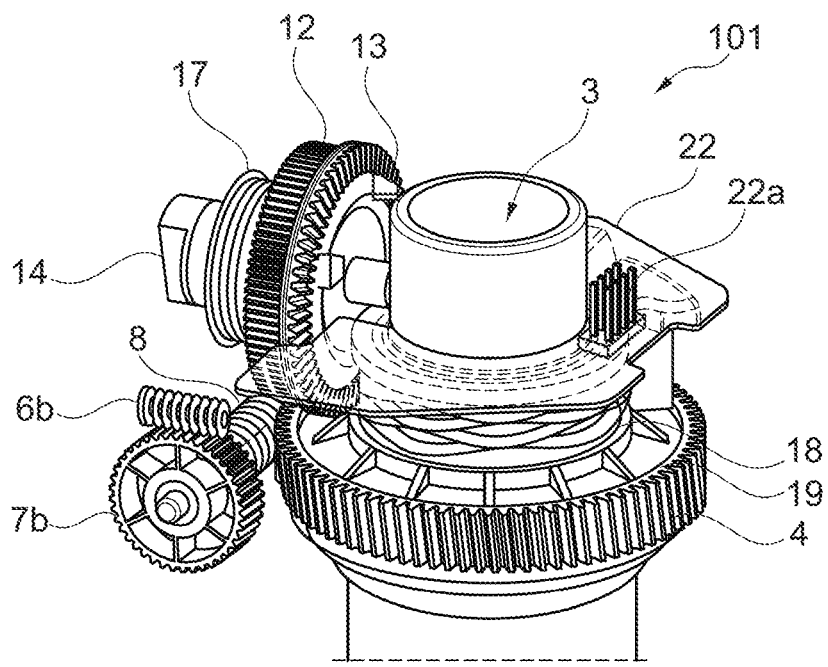
FIG. 5 is a schematic illustration of a perspective partial view of the actuator shown in FIG. 2.
Figure 6:
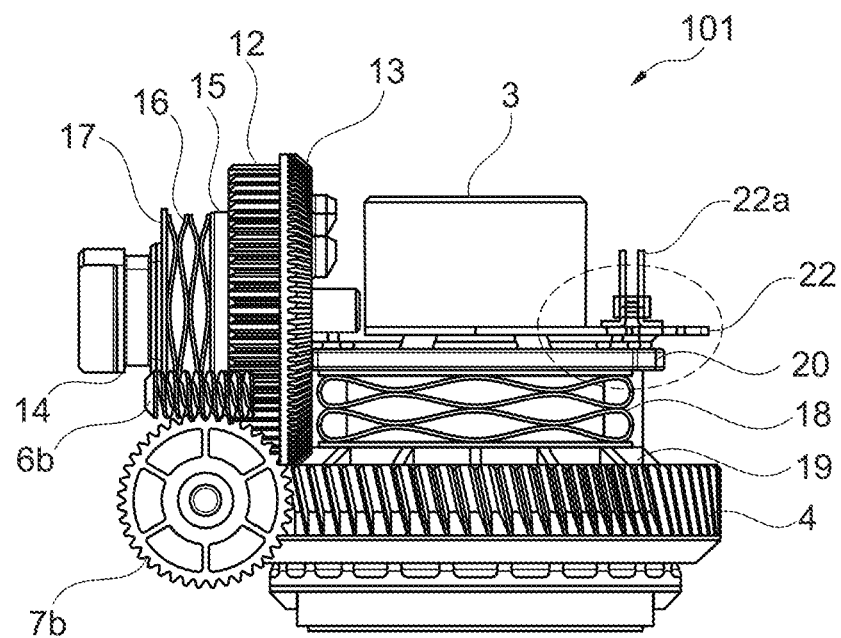
FIG. 6 is a schematic illustration of a lateral partial view of the actuator shown in FIG. 2.

FIGS. 5 and 6 show the actuator with the drive assembly being more complete than FIG. 4. In particular, the printed circuit board 22 has been added.

Figure 7:
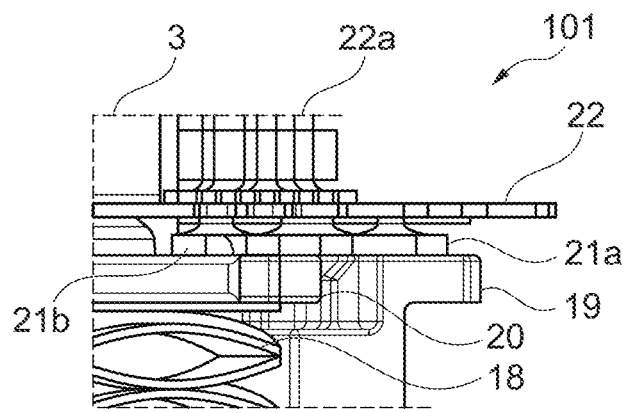
FIG. 7 is a schematic illustration of an enlarged view of a detail of the actuator shown in FIG. 6.

FIG. 7 shows an enlarged detail of FIG. 6 in order to better visualize the components providing the memory function mentioned above.

For providing a tilt memory function or a tilt position sensing the tilt drive train has a tilt wiper bevel gear 19, a tilt wiper 21a being attached to a tilt wiper bevel gear 19 and electrically contacting the tilt carbon strip of the printed circuit board 22 and a tilt bevel gear 13. The tilt wiper bevel gear 19 engages the tilt bevel gear 13 which is torque-proof fastened to the tilt axle 14. By the engagement of the tilt bevel gear 13 and the tilt wiper bevel gear 19 a rotation of the tilt axle 14 about the tilting axis 14*a* is transformed into a rotation of the tilt wiper bevel gear 19 about the folding axis 3*b*.

For providing a fold memory function or a fold position sensing the fold drive train has a fold wiper 21*b* being attached to the fold retainer 20 and electrically contacting the fold carbon strip of the printed circuit board 22. The fold retainer 20 is torque-proof fastened to the body 3.

At least one not shown alternative potentiometer can be used for drive position sensing enabling drive position feedback of the tilting and/or folding angles.

FIG. 8 shows all components of the actuator 101 in an unmounted stated. In particular, the drive assembly has a common shaft 11 which is part both of the tilt drive train and the fold drive train. The common shaft 11 bears rotatably and independently from each other the second tilt worm gear 10 and the second fold worm gear 8.

During automatic operation of the rear view device 100, the printed circuit board 22 is provided with electric control commands by means of the wiring harness for independently rotating the rear view device 100 about the folding axis 3*b* or about the tilting axis 14*a*, respectively, relative to the base frame 103.

When an electric tilt command is provided the printed circuit board 22 activates the tilt electric motor 5*a* to rotate the tilt drive shaft with a rotational speed for adjusting the rear view device 100 to a driver of the vehicle. The tilt drive train transforms the rotation of the tilt drive shaft into a rotation of the tilt axle 14, i.e. the lower mirror housing 2 fastened thereto, about the tilting axis 14*a* relative to the actuator housing 1, 2. As the mirror is fixed to the lower mirror housing 102, the rotation of the lower mirror housing 102 rotates the mirror about the tilting axis 14*a*.

When an electric fold command is provided the printed circuit board 22 activates the fold electric motor 5*b* to rotate the fold drive shaft with the first rotational speed for rotating the rear view device 100 about the folding axis 3*b* in a fold-in or fold-out operation or with the second rotational speed for rotating the rear view device 100 in order to adjust the mirror for a better viewing of the driver of the vehicle. The fold drive train transforms the rotation of the tilt drive shaft into a rotation of the actuator housing 1, 2, i.e. the lower mirror housing fastened to the tilt axle 14, about the folding axis 3*b* relative to the body 3.

For manual operation of the rear view device 100, a rotational moment is applied to the rear view device 100. For folding the rear view device 100 a folding moment relative to the folding axis 3*b* exceeding the frictional force of the fold clutch interface 23 is applied to the lower mirror housing 102. For tilting the rear view device 100 a tilting moment relative to the tilting axis 14*a* exceeding the frictional force of the tilt clutch interface 24 is manually applied to the lower mirror housing 102.

Figure 9:
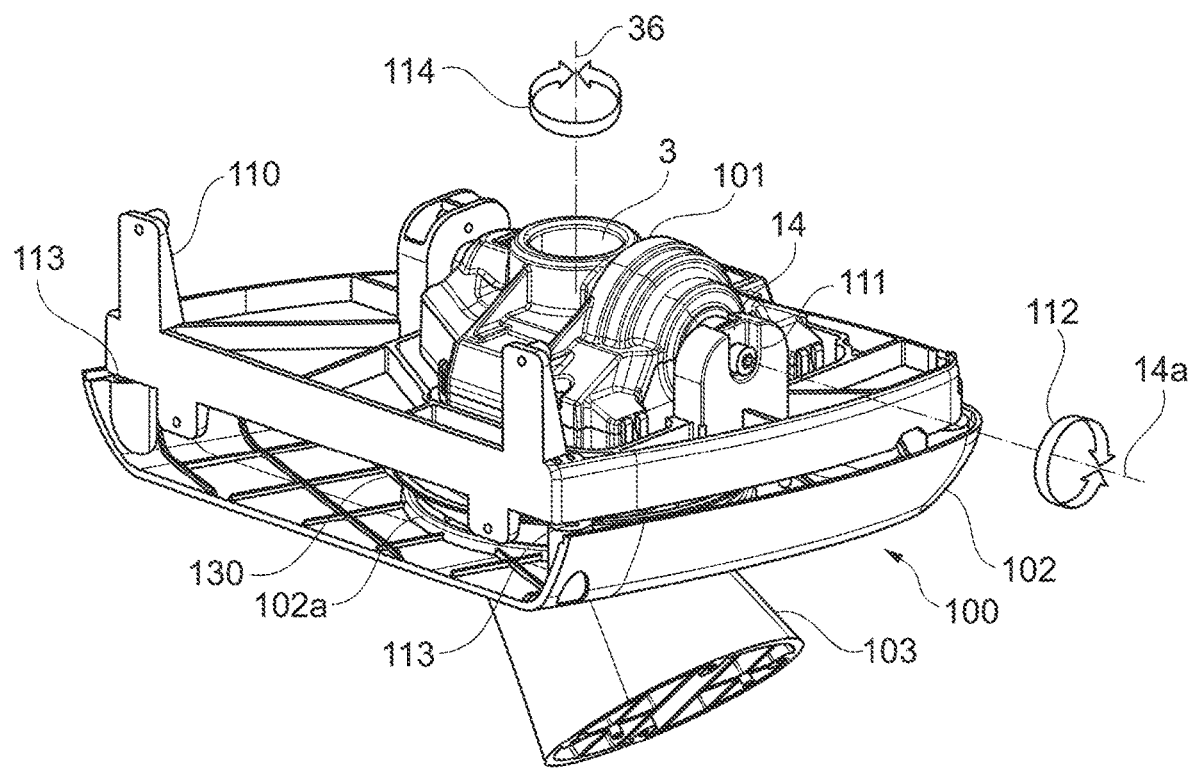
FIG. 9 is a schematic illustration of an embodiment of the rear view device.

FIG. 9 shows an illustration of an embodiment of the rear view device 100, the lower mirror housing 102 from FIG. 1, a base frame 103, the actuator 101 and a mirror holder 110. The mirror holder 110 is fastened to the tilt axle 14 of the actuator 101 by fastening means 111, so that when rotating the tilt axle 14, the fastening means 111 and thus the mirror holder 110 is rotated relative to the body 3 or relative to the base frame 103 about the tilting axis 14*a*, as indicated by the arrow 112. The mirror holder 110 is attached to the lower mirror housing 102 using fastening means 113 so that the lower mirror housing 102 is also tilted. The actuator 101 and thus also the mirror holder 110 are thus rotated relative to the body 3 or relative to the base frame 103 about the folding axis 3*b*, as indicated by the arrow 114. The tilt axle 14 is attached to the mirror holder 110 via the fastening means 111, in particular by inserting the tilt axle 14 into a U-shaped opening 111 for obtaining a form fit and/or frictional connection.

Between the base frame 103 and the actuator 101, a cone-shaped member 130 is disposed, wherein the cone-shaped member 130 is spaced relative to the through hole 102*a* of the lower mirror housing 102 to allow the tilting movement of the lower mirror housing 102 about the axis 14*a*.

Figure 10:
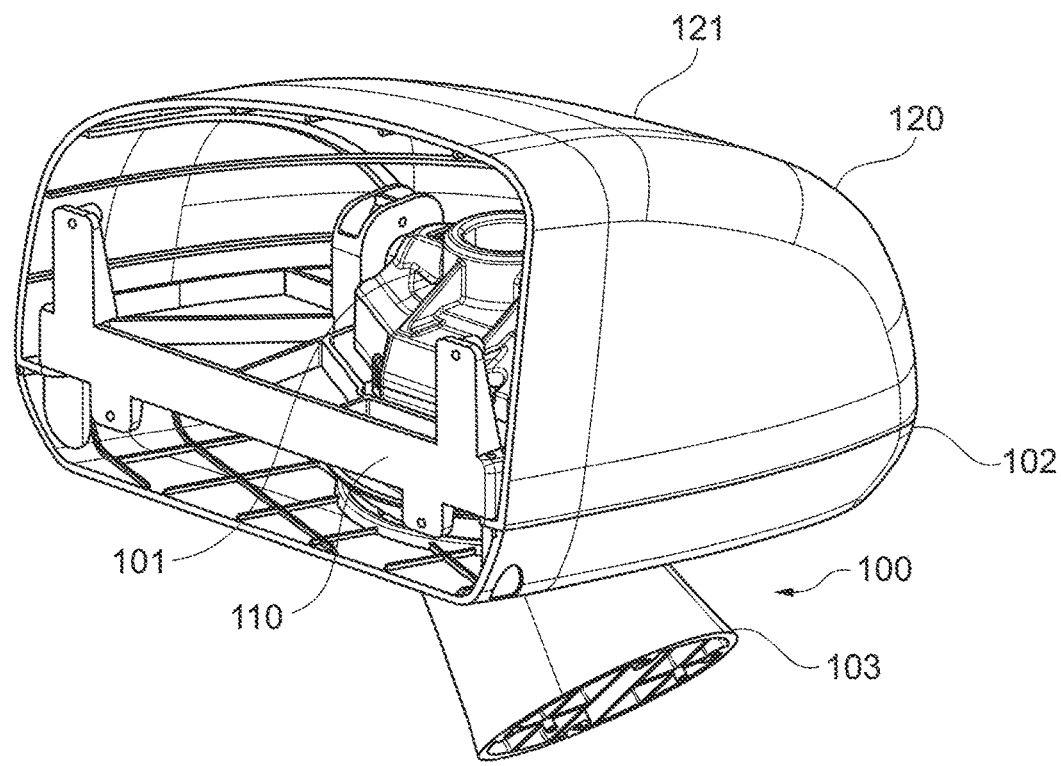
FIG. 10 is a schematic illustration of an embodiment of the rear view device with an upper mirror housing.

FIG. 10 shows the embodiment of the rearview device 100 of FIG. 9, wherein the lower mirror housing 102 has been attached to an upper mirror housing 120. In this way the lower mirror housing 102 and the upper mirror housing 120 are also tilted, when rotating the actuator 101 about the axes 14*a* and 3*b* for folding and tilting the rear view device 100. A mirror head 121 comprises the lower mirror housing 102, the upper mirror housing 120, the mirror holder 110 and the actuator 101, wherein the mirror head 121 is attached to the base frame 103.

Figure 11:
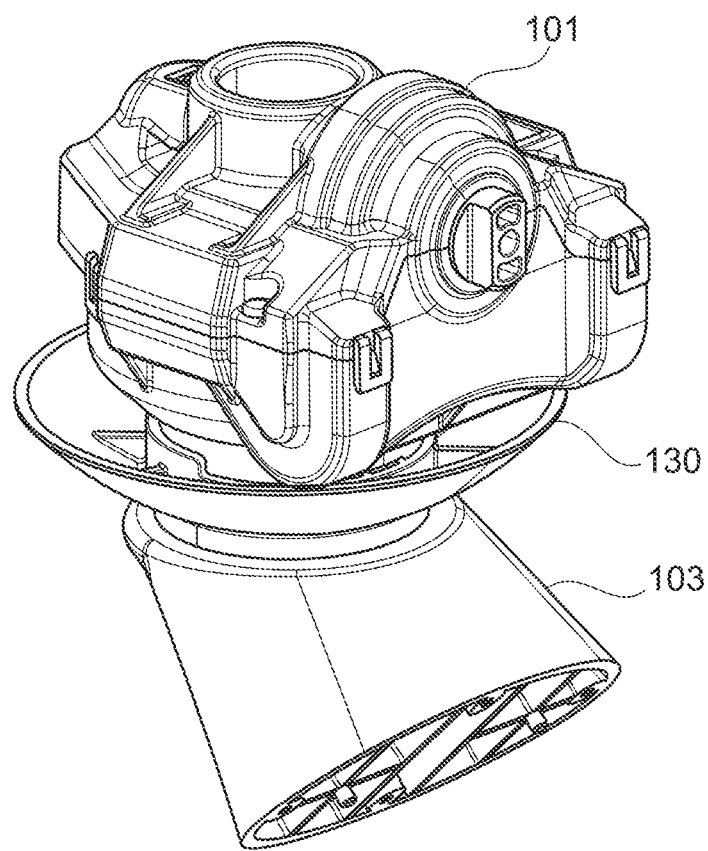
FIG. 11 is a schematic illustration of an embodiment of the rear view device with a cone-shaped member.

FIG. 11 shows an embodiment of the rearview device 100 from FIGS. 9 and 10, wherein for better clarity, the mirror housing and the mirror holder have been removed. The cone-shaped member 130 is arranged between the base frame 103 and the actuator 101 to prevent the entry of spray water into the interior of the mirror housing 102, 120.

The cone-shaped member 130 has a primary function as part of a mirror sealing used in principle as an internal static spherical shield, upon which an external lip seal (not shown) would interact. The lip seal could be part of the lower mirror housing 102 or some other nearby structure.

Figure 12:
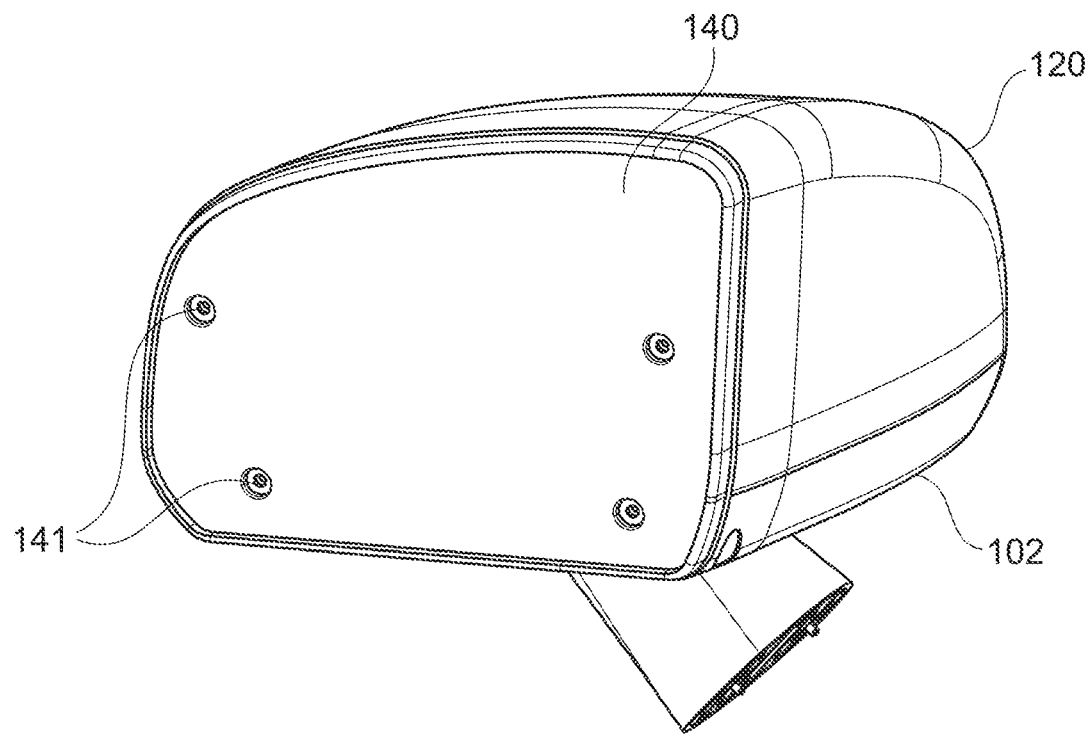
FIG. 12 is a schematic illustration of an embodiment of the rear view device with a mirror.

FIG. 12 shows an embodiment of the rearview device 100 from FIGS. 9, 10 and 11, wherein a mirror 140 is additionally attached to the mirror holder 110 from FIG. 10 using the fastening means 141. During the rotational movement of the actuator 101 for folding and tilting about the axes 3*b* and 14*a*, the mirror 140 is also rotated together with the two mirror housings 102 and 120.

Alternatively, the mirror can also be fixed to the lower mirror housing 102 directly.

The embodiments shown here are only examples of the present invention and must therefore not be understood as restrictive. Alternative embodiments considered by the skilled person are equally covered by the scope of protection of the present invention.

LIST OF REFERENCE NUMERALS 1 upper actuator housing
1*a* through-hole
2 lower actuator housing
3 body
3*a* central bore
3*b* folding axis
4 fold clutch gear
5*a* tilt electric motor
5*b* fold electric motor
6*a* first tilt worm gear
6*b* first fold worm gear
7*a* second tilt spur gear
7*b* fold spur gear
8 second fold worm gear
9 first tilt spur gear
10 second tilt worm gear
11 common shaft
12 tilt clutch gear 13 tilt bevel gear
14 tilt axle
14a tilting axis
15 tilt clutch insert
16 tilt spring
17 tilt retainer
18 fold spring
19 tilt wiper bevel gear
20 fold retainer
21a tilt wiper
21b fold wiper
22 printed circuit board
22a pin
23 fold clutch interface
24 tilt clutch interface
100 rear view device
101 actuator
102 lower mirror housing
102a through-hole
103 base frame
110 mirror holder
111 fastening means
112 arrow
113 fastening means
114 arrow
120 upper mirror housing
121 mirror head
130 cone-shaped member
140 mirror
141 fastening means

What is claimed is:

1. An actuator for a rear view device of a vehicle, the rear view device including a mirror head, the actuator comprising:
a body defining a folding axis for the mirror head;
a tilt axle fastened to the rear view device and defining a tilting axis for the mirror head;
an actuator housing being rotatable borne by the body and being configured for rotatably bearing the tilt axle; and
a drive assembly being arranged completely within the actuator housing and being configured for rotating the actuator housing about the folding axis relative to the body by a folding angle and for rotating the tilt axle about the tilting axis relative to the actuator housing by a tilting angle,
wherein the drive assembly has a tilt drive train for rotating the tilt axle and a fold drive train for rotating the actuator housing, and
the tilt drive train and the fold drive train are configured to work completely independently from each other, wherein a first gear of the fold drive train shares a common shaft with a second gear of the tilt drive train, the first and second gears configured to independently rotate on the common shaft, and
wherein the actuator is operable to adjust the mirror head along the tilting axis and the folding axis, and wherein the tilting axis and the folding axis are substantially perpendicular.

2. The actuator according to claim 1, wherein the tilt drive train comprises:
a tilt electric motor;
a first tilt worm gear being torque-proof fastened to a drive shaft of the tilt electric motor;
a tilt clutch gear being frictionally engaged with the tilt axle;
a first tilt spur gear being engaged with the tilt clutch gear;
a second tilt worm gear being engaged with the first tilt spur gear; and
a second tilt spur gear being engaged with the first tilt worm gear and torque-proof fastened to the second tilt worm gear.

3. The actuator according to claim 2, wherein the tilt drive train comprises:
a tilt spring;
a tilt clutch insert; and
a tilt retainer axially fastened to the tilt axle, the tilt clutch gear and the tilt clutch insert both having matching bevel sections for engaging frictionally, and
the tilt spring being supported by the tilt retainer and configured for pressing the bevel section of the tilt clutch insert against the corresponding bevel section of the tilt clutch gear.

4. The actuator according to claim 2, wherein the tilt drive train comprises:
a tilt spring; and
a plurality of tilt clutch plates mounted to the tilt axle,
a first number of the plurality of tilt clutch plates engaging with the tilt axle, and a remaining second number of the plurality of tilt clutch plates engaging with the tilt clutch gear and remaining fixed in response to an external moment being applied manually to the tilt axle.

5. The actuator according to claim 1, wherein at least one of:
the tilt drive train comprises a position sensing potentiometer providing a position feedback of the tilt angle, or
the tilt drive train comprises a tilt wiper bevel gear, a tilt wiper being attached to a tilt wiper bevel gear and electrically contacting a tilt carbon strip and a tilt bevel gear, and the tilt wiper bevel gear engages the tilt bevel gear being torque-proof fastened to the tilt axle.

6. The actuator according to claim 1, wherein the fold drive train comprises:
a fold electric motor, and
gears for rotatably coupling the body to the fold electric motor.

7. The actuator according to claim 6, wherein the gears comprise:
a first fold worm gear being torque-proof fastened to a drive shaft of the fold electric motor;
a fold clutch gear being frictionally engaged with the body;
a second fold worm gear being engaged with the fold clutch gear; and
a fold spur gear being engaged with the fold worm gear and torque-proof fastened to the second fold worm gear.

8. The actuator according to claim 7, wherein
the fold drive train comprises a fold spring and a fold retainer axially fastened to the body,
the body and the fold clutch gear both have corresponding bevel sections for engaging frictionally, and
the fold spring is supported by the fold retainer and configured for pressing the bevel section of the fold clutch gear against the corresponding bevel section of the body.

9. The actuator according to claim 8,
wherein at least one of:
the fold drive train comprises a position sensing potentiometer providing a position feedback of the folding angle, or the fold drive train comprises a fold wiper being attached to the fold retainer with the fold wiper electrically contacting a fold carbon strip, and wherein the fold retainer is torque-proof fastened to the body.

10. The actuator according to claim 7, wherein the fold drive train comprises a fold spring; and a plurality of fold clutch plates mounted to the fold clutch gear, a first number of the fold clutch plates engaging with the fold clutch gear for rotating with the fold clutch gear, and a remaining second number of the fold clutch plates engaging with the body remaining fixed in response to an external moment being applied manually to the fold clutch gear through the actuator housing.

11. The actuator according to claim 7, wherein the tilt drive shaft of the tilt electric motor, the fold drive shaft of the fold electric motor, and the tilting axis extend parallel.

12. The actuator according to claim 7, wherein the common shaft bears rotatably and independently from each other the second tilt worm gear and the second fold worm gear.

13. The actuator according to claim 6, wherein the tilt electric motor and the fold electric motor are arranged at opposite sides of the body.

14. The actuator according to claim 1, wherein at least one of:

the body extends through the actuator housing, and/or the tilting axis extends perpendicular relative to the folding axis.

15. The actuator according to claim 1, wherein the actuator housing is two-part.

16. The actuator according to claim 15, wherein the two-part actuator housing comprises a lower actuator housing and an upper actuator housing.

17. The actuator according to claim 16, wherein at least one of:

the upper actuator housing has an upper bearing section matching a corresponding bearing section of the body, or the lower actuator housing has a lower bearing section matching a corresponding bearing section of the body.

18. The actuator according to claim 1, wherein the body is shaped as a hollow core having a central bore extending parallel to the folding axis.

19. The actuator according to claim 1, wherein the drive assembly is configured for allowing a folding angle to have an absolute value less or equal to 70° relative to a neutral folding angle and/or for allowing a tilting angle to have an absolute value less or equal to 15° relative to a neutral tilting angle.

20. The actuator according to claim 19, wherein the printed circuit board is configured for controlling the fold electric motor by a pulse width modulation, the pulse width modulation allowing at least two different rotational speeds for the fold electric motor.

21. The actuator according to claim 1, wherein the drive assembly has a printed circuit board being torque-proof fastened to the actuator housing and having a recess to accommodate the body, and the printed circuit board is configured for controlling the fold electric motor.

22. The actuator according to claim 21, wherein at least one of:

the printed circuit board comprises a circular fold carbon strip to be electrically contacted by the fold wiper and circular tilt carbon strip to be electrically contacted by the tilt wiper, or the printed circuit board comprises a plurality of electrically conducting pins and the actuator housing comprises a corresponding through-hole for allowing an external access to the pins, the pins and the through-hole forming a plug socket of the actuator for receiving a plug of a wiring harness.

23. The actuator according to claim 1, wherein the tilting axis extends transverse relative to the folding axis.

24. A sub-assembly comprising a mirror head of a rear view device and the actuator according to claim 1.

25. The sub-assembly of claim 24, wherein the actuator is either directly attached to a lower mirror housing or via a mirror holder, and an upper mirror housing is either directly attached to the lower mirror housing or via the mirror holder.

26. The sub-assembly according to claim 25, wherein the tilt axle is attached to the mirror holder via fastening means by inserting the tilt axle into a U-shaped opening for obtaining one or more of a form fit or a frictional connection.

27. The sub-assembly of claim 24, wherein a lower mirror housing has a through-hole, and the body of the actuator extends through the through-hole.

28. A rear view device for a vehicle, comprising:

a base frame for attachment to the vehicle; and the sub-assembly according to claim 24, wherein the body of the actuator is attached to the base frame.

29. The rear view device according to claim 28, further comprising a sealing member sealing a gap between the body and the lower mirror housing.

30. The rear view device according to claim 28, further comprising a cone-shaped member arranged between the base frame and the actuator.

31. A door for a vehicle, comprising:

at least one wiring harness with a plug; and the rear view device according to claim 28, wherein a base frame of the rear view device is torque-proof fastened to the door, the at least one wiring harness extends through the body and the at least one plug of the at least one wiring harness is plugged into at least one plug socket of the actuator.

32. A vehicle, comprising:

the rear view device according to claim 28; and a door for a vehicle, comprising:

at least one wiring harness with a plug; and the rear view device, wherein a base frame of the rear view device is torque-proof fastened to the door, the at least one wiring harness extends through the body and the at least one plug of the at least one wiring harness is plugged into at least one plug socket of the actuator.

* * * * *